(12) United States Patent
Li et al.

(10) Patent No.: US 12,120,670 B2
(45) Date of Patent: Oct. 15, 2024

(54) METHOD AND APPARATUS FOR SELF-SCHEDULED UPLINK TRANSMISSION

(71) Applicant: Telefonaktiebolaget LM Ericsson (publ), Stockholm (SE)

(72) Inventors: Gen Li, Beijing (CN); Jinhua Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 690 days.

(21) Appl. No.: 17/280,942

(22) PCT Filed: Sep. 30, 2018

(86) PCT No.: PCT/CN2018/109000
§ 371 (c)(1),
(2) Date: Mar. 29, 2021

(87) PCT Pub. No.: WO2020/062210
PCT Pub. Date: Apr. 2, 2020

(65) Prior Publication Data
US 2021/0345371 A1    Nov. 4, 2021

(51) Int. Cl.
*H04W 72/12* (2023.01)
*H04W 72/1268* (2023.01)
*H04W 72/21* (2023.01)

(52) U.S. Cl.
CPC ....... *H04W 72/1268* (2013.01); *H04W 72/21* (2023.01)

(58) Field of Classification Search
CPC ............. H04W 72/1268; H04W 72/21; H04W 74/0808; H04W 72/02
See application file for complete search history.

(56) References Cited

U.S. PATENT DOCUMENTS

| 11,622,358 B2* | 4/2023 | Yao | H04W 72/541 |
| | | | 370/329 |
| 11,770,821 B2* | 9/2023 | Li | H04W 74/08 |
| | | | 370/329 |
| 2008/0049669 A1* | 2/2008 | Lundby | H04W 24/10 |
| | | | 370/329 |
| 2012/0163313 A1* | 6/2012 | Jung | H04W 12/062 |
| | | | 370/329 |

(Continued)

FOREIGN PATENT DOCUMENTS

| CN | 108271430 A | 7/2018 |
| CN | 108289335 A | 7/2018 |
| WO | 2017199205 A1 | 11/2017 |

OTHER PUBLICATIONS

EPO Communication and Supplementary European Search Report dated May 24, 2022 for Patent Application No. 18934557.2, consisting of 8-pages.

*Primary Examiner* — Hoang-Chuong Q Vu
(74) *Attorney, Agent, or Firm* — Weisberg I.P.Law, P.A.

(57) ABSTRACT

A method for data transmission is proposed. The method which may be implemented in a terminal device comprises receiving, from a network node, configuration information about capability of the terminal device to schedule uplink data transmission to the network node. The method further comprises determining whether to schedule, by the terminal device, the uplink data transmission, based at least in part on the configuration information.

14 Claims, 17 Drawing Sheets

(56) References Cited

U.S. PATENT DOCUMENTS

| | | | |
|---|---|---|---|
| 2017/0026999 A1* | 1/2017 | Baldemair | H04W 74/006 |
| 2017/0257878 A1* | 9/2017 | Kazmi | H04W 72/535 |
| 2017/0273072 A1* | 9/2017 | Wittberg | H04W 76/27 |
| 2018/0014322 A1* | 1/2018 | Loehr | H04W 28/0278 |
| 2018/0035459 A1* | 2/2018 | Islam | H04L 5/0053 |
| 2018/0167916 A1 | 6/2018 | Zhang et al. | |
| 2018/0176945 A1* | 6/2018 | Cao | H04L 5/0044 |
| 2018/0279348 A1* | 9/2018 | Huang | H04W 76/27 |
| 2019/0081741 A1* | 3/2019 | Al-Imari | H04L 1/1671 |
| 2019/0116490 A1* | 4/2019 | Chang | H04W 72/1268 |
| 2019/0335505 A1* | 10/2019 | Li | H04W 72/1268 |
| 2019/0349954 A1* | 11/2019 | Quan | H04W 72/1268 |
| 2019/0379491 A1* | 12/2019 | Kilinc | H04L 1/1835 |
| 2020/0146029 A1* | 5/2020 | Takeda | H04L 1/1887 |
| 2020/0169987 A1* | 5/2020 | Chen | H04W 72/56 |
| 2021/0136729 A1* | 5/2021 | Yasukawa | H04L 1/1887 |

\* cited by examiner

METHOD AND APPARATUS FOR SELF-SCHEDULED UPLINK TRANSMISSION

FIELD OF THE INVENTION

The present disclosure generally relates to communication networks, and more specifically, to data transmission in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate. In order to meet diverse service requirements, the wireless communication networks need to allocate radio resource adaptively for transmissions of various traffic data. A scheduling scheme of data transmission may affect quality of service and utilization of radio resource. Thus, it is desirable to configure scheduling of data transmission efficiently.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In wireless communication networks such as LTE and NR, the scheduling of uplink (UL) data transmission is usually controlled by a network node such as a base station (BS). A terminal device such as user equipment (UE) can transmit UL data, for example, according to the dynamic or configured UL scheduling by the network node. However, UL data buffered at the terminal device may not be emptied by UL transmissions scheduled by the network node, due to insufficient radio resource granted by the network node. Therefore, it may be desirable to improve configuration of data transmission scheduling in a more efficient way.

The present disclosure proposes a solution of scheduling data transmission in a communication network, which enables a terminal device to have self-scheduling capability, so that the terminal device can perform UL data transmissions scheduled by itself to empty the buffered data, without waiting for further UL grant(s) from the network node.

According to some exemplary embodiments, an UL grant may comprise some scheduling configurations for a UE, for example, resource allocation, transmission parameters such as a rank indicator (RI) or a precoding matrix indicator (PMI), etc. Correspondingly, the UE may transmit UL data according to the UL grant received from a BS.

According to a first aspect of the present disclosure, there is provided a method implemented at a terminal device. The method may comprise receiving, from a network node, configuration information about capability of the terminal device to schedule UL data transmission to the network node. The method may further comprise determining whether to schedule, by the terminal device, the UL data transmission, based at least in part on the configuration information.

In accordance with an exemplary embodiment, the method according to the first aspect of the present disclosure may further comprise: generating a scheduling message based at least in part on the configuration information received from the network node.

In accordance with an exemplary embodiment, the method according to the first aspect of the present disclosure may further comprise: transmitting the scheduling message to the network node to indicate scheduling of the UL data transmission by the terminal device. According to an exemplary embodiment, the scheduling message may be transmitted by the terminal device upon transmission of UL data scheduled by the network node.

In accordance with an exemplary embodiment, the method according to the first aspect of the present disclosure may further comprise: initiating the UL data transmission scheduled by the terminal device, in response to completion of transmitting the UL data scheduled by the network node.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus may comprise a receiving unit and a determining unit. In accordance with some exemplary embodiments, the receiving unit may be operable to carry out at least the receiving step of the method according to the first aspect of the present disclosure. The determining unit may be operable to carry out at least the determining step of the method according to the first aspect of the present disclosure.

According to a fifth aspect of the present disclosure, there is provided a method implemented at a network node. The method may comprise determining configuration information about capability of a terminal device to schedule UL data transmission to the network node. The method may further comprise transmitting the configuration information to the terminal device for determination of whether to schedule, by the terminal device, the UL data transmission.

In accordance with an exemplary embodiment, the method according to the fifth aspect of the present disclosure may further comprise: receiving UL data scheduled by the terminal device which is capable of scheduling the UL data transmission, in response to determination, by the terminal device, of scheduling the UL data transmission.

In accordance with an exemplary embodiment, the method according to the fifth aspect of the present disclosure may further comprise: receiving a scheduling message from the terminal device to indicate the scheduling of the UL data transmission by the terminal device. According to an exemplary embodiment, the scheduling message may be received by the network node upon reception of UL data scheduled by the network node.

In accordance with an exemplary embodiment, the method according to the fifth aspect of the present disclosure may further comprise: determining that at least one radio resource unit available for the UL data transmission is unused by the terminal device; and using the at least one unused radio resource unit to schedule data transmission.

According to a sixth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus. The apparatus may comprise a determining unit and a transmitting unit. In accordance with some exemplary embodiments, the determining unit may be operable to carry out at least the determining step of the method according to the fifth aspect of the present disclosure. The transmitting unit may be operable to carry out at least the transmitting step of the method according to the fifth aspect of the present disclosure.

In accordance with an exemplary embodiment, the configuration information may indicates at least one of: one or more radio resource units available for the UL data transmission; one or more configuration schemes applicable to the UL data transmission; and a maximum time duration allowed for the UL data transmission.

In accordance with an exemplary embodiment, the one or more radio resource units may comprise at least one radio resource unit sharable by the terminal device and one or more other terminal devices.

In accordance with an exemplary embodiment, the configuration information may comprise an indicator of whether to enable or disable the capability of the terminal device to schedule the UL data transmission.

In accordance with an exemplary embodiment, the configuration information may be included in at least one of: radio resource control signaling; a medium access control layer control element for the terminal device; and downlink control information.

In accordance with an exemplary embodiment, the terminal device is capable of scheduling the UL data transmission. In this case, the determination of whether to schedule the UL data transmission by the terminal device based at least in part on the configuration information may comprise: determining whether radio resource granted by the network node is enough to empty UL data buffered at the terminal device; and determining to schedule the UL data transmission by the terminal device, in response to the determination that the granted radio resource is not enough to empty the UL data buffered at the terminal device. The granted radio resource may be available for the terminal device to transmit UL data scheduled by the network node.

In accordance with an exemplary embodiment, the determination of scheduling the UL data transmission by the terminal device may be made further in response to at least one of that: the UL data transmission is for a service with a predefined quality class; and the UL data transmission enables the UL data buffered at the terminal device to be emptied.

In accordance with an exemplary embodiment, the scheduling message may indicate at least one of: one or more radio resource units used for the UL data transmission; a configuration scheme applied to the UL data transmission; and a time duration of the UL data transmission.

In accordance with an exemplary embodiment, the scheduling message may be included in at least one of: a medium access control layer control element for the network node; and uplink control information.

In accordance with an exemplary embodiment, the scheduling of the UL data transmission by the terminal device may be based at least in part on a transmission configuration of UL data scheduled by the network node.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
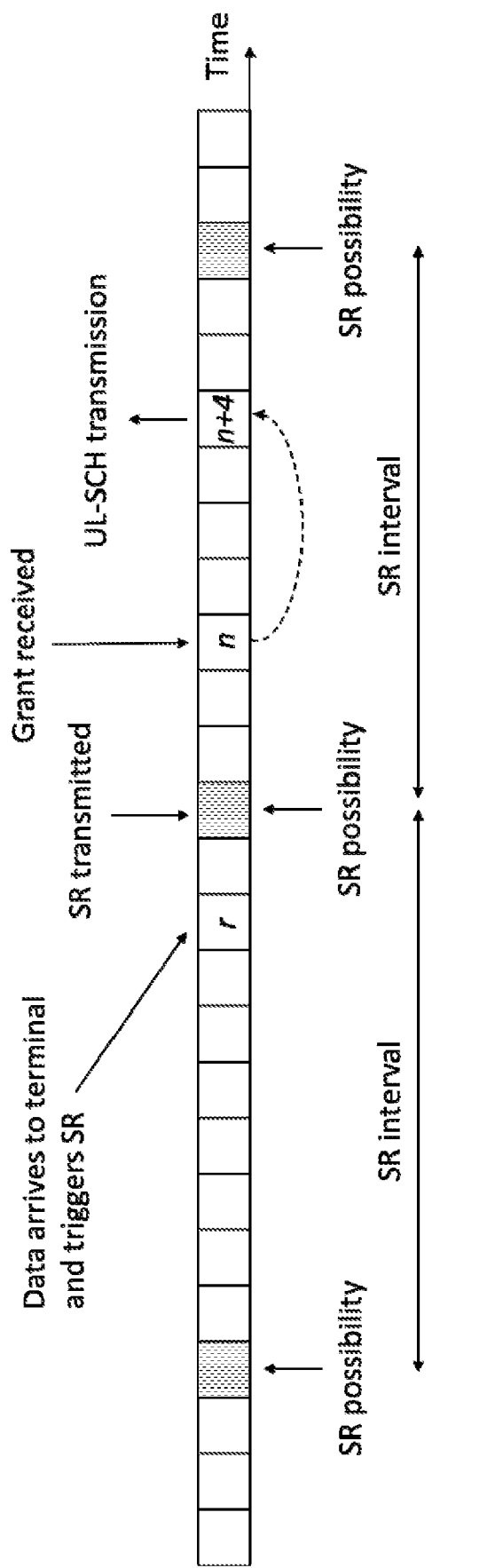
FIG. 1 is a diagram illustrating an example of UL scheduling and transmission according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on traffic capacity and data rates, one interesting option for communication technique development is to allow a wireless communication network such as LTE or NR to configure more flexible and adaptive scheduling of data transmissions.

FIG. 1 is a diagram illustrating an example of UL scheduling and transmission according to some embodiments of the present disclosure. The example shown in FIG. 1 may be applicable to an LTE scenario where an eNB can fully control the scheduling of UL data transmissions from terminal devices such as UEs. It will be appreciated that there may be other scenarios where the communication network may apply or support various radio interface technologies which are not limited to LTE technology.

In the example shown in FIG. 1, a scheduler at the eNB needs knowledge about the amount of data awaiting transmission from the UEs to assign the proper amount of UL resources. Obviously, there is no need to provide UL resource to a UE without data to transmit as this may only result in that the UE performs padding to fill up the granted resource. Hence, as a minimum, the scheduler needs to know whether the UE has data to transmit and requests an UL grant. The knowledge about the UL data transmission of the UE may be informed to the eNB by a scheduling request (SR) and a buffer status report (BSR) from the UE. The SR may be a simple flag, raised by the UE to request UL resource from the scheduler at the eNB.

Since the UE requesting the UL resource by definition has no physical uplink shared channel (PUSCH) resource, the SR may be transmitted on the physical uplink control channel (PUCCH). The UE can be assigned a dedicated PUCCH resource for transmitting the SR. There may be one transmission opportunity (which is indicated by "SR possibility" in FIG. 1) every mth subframe. When UL data arrives (e.g., at subframe r), the UE can trigger transmission of the SR. Upon the reception of the SR from the UE, the scheduler at the eNB can assign a grant to the UE. If the UE does not receive a grant for scheduling UL data transmission until the next possible transmission opportunity for the SR, then the SR may be repeated. If the UE receives a grant from the eNB (e.g., at subframe n), it can transmit the UL data in the granted resource (e.g., at subframe n+4). Besides, the current BSR may also be transmitted by the UE in the uplink-shared channel (UL-SCH) transmission carrying the UL data to request more UL grants. Then the eNB can know how many radio resources need to be scheduled for the UE.

The eNB controlled scheduling procedure as shown in FIG. 1 may also be applicable to NR systems. Compared to LTE systems, there may be significant reduction of the SR/grant/UL transmission delay in NR systems due to the short L1&L2 processing delay requirement. Even so, there is still a room to improve channel contending for data transmission. Further, the latency requirement is challenging for some 5G use cases, such as ultra-reliable and low latency communication (URLLC). Therefore, further improvement of UL transmission latency is also introduced, for example, configured scheduling.

In a NR scenario, autonomous UL transmission can be performed according to the configured scheduling scheme. There may be two types of configured scheduling schemes for UL data transmission. For Type 1, an UL grant for a UE may be configured by an eNB via radio resource control (RRC) signaling which can carry all parameters (e.g., periodicity, start, hybrid automatic repeat request (HARQ) operation, cell specific-radio network temporary identifier (CS-RNTI), power control, time-frequency resources, modulation and coding scheme (MCS) and etc.) for the configured scheduling. For Type 2, some parameters (e.g., periodicity, start, HARQ operation, CS-RNTI, power control, etc.) for the UL grant may be configured via RRC signaling while other parameters (such as time-frequency resources, MCS, etc.) may be configured in physical downlink control channel (PDCCH) to activate the configured UL grant.

For the configured scheduling in the UL, the transmission opportunity may appear periodically, for example, every 7 orthogonal frequency division multiplexing (OFDM) symbols with 4 physical resource block (PRB) groups. For the autonomous UL transmission, the UE can initiate UL transmission based on the UL grant without SR transmission or specific UL grant reception for each transmission opportunity. There may be a HARQ process associated with each UL transmission according to the configured UL grant. The retransmission of a data block of which the initial transmission is performed by using the configured UL grant may be dynamically scheduled by the eNB using the PDCCH addressed to CS-RNTI. Meanwhile the eNB may assign a HARQ process, which is arranged for the configured grant, to a dynamic UL grant if necessary.

In general, the dynamic and configured UL scheduling schemes as mentioned above can satisfy the latency requirements for most of service cases. However, the latency problem still exists in UL data transmissions and may become the weakness to secure a channel in some cases, especially high load cases for unlicensed operation. Since the unlicensed band is generally shared by several radio devices of similar or dissimilar wireless technologies, a listen-before-talk (LBT) procedure may need to be applied by a terminal device before transmitting on a channel that uses the unlicensed band. The LBT procedure requires the terminal device to perform a clear channel assessment to determine if the channel is available. In the case that the channel is unavailable, the granted resource available for UL data transmission may be insufficient to empty a data buffer at the terminal device.

Figure 2A:
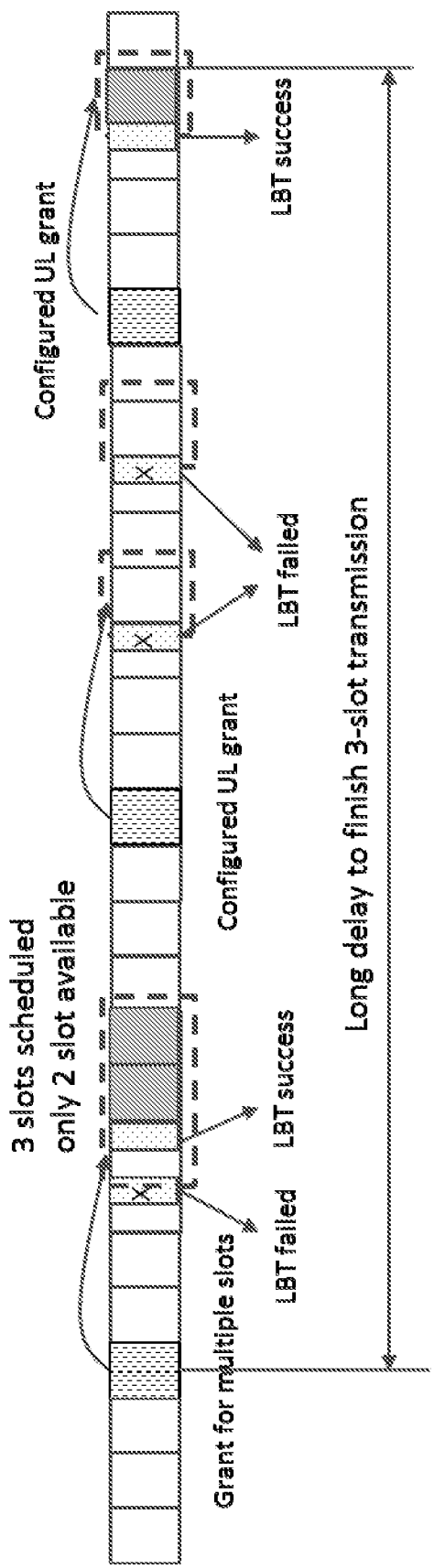
FIG. 2A is a diagram illustrating an example of UL scheduling on the unlicensed band according to some embodiments of the present disclosure.

FIG. 2A is a diagram illustrating an example of UL scheduling on the unlicensed band according to some embodiments of the present disclosure. Due to the uncertainty of a channel on the unlicensed band, for example, the channel is not available based on LBT results (i.e. the channel is being used by another device), a UE may fail to get the channel in the beginning of the granted slot. For the example shown in FIG. 2A, a gNB sends an UL grant to the UE to indicate 3 continuous UL slots for data transmission. However, the first granted slot is blocked according to the LBT result, so actually there are only 2 slots available for UL data transmission of the UE (assuming LBT is successful in the beginning of the second granted slot).

It can be seen that if the gNB schedules the exact number of slots which matches the reported buffer status by the UE, it is possible that the UE cannot transmit all the buffered data in the case that the UE fails to get the channel in the beginning of the granted slots due to the LBT result. Since time division duplex (TDD) is applied for unlicensed carriers, for self-carrier scheduling, further new UL grant(s) can only be sent to the UE for the rest data after the PUSCH transmission(s) according to the previous grants, i.e. uplink/downlink (UL/DL) switch occurs. Upon each transmitter/receiver role switch of the gNB and the UE, an LBT attempt is required to determine the channel availability, and the risk of losing the channel increases in proportional to the number of LBT attempts. Further, the intermitted UL transmission may also result in additional overhead due to additional UL/DL switch, new grant transmission, and HARQ feedback. In summary, such intermittent UL transmission due to the scheduling procedure may result in the weakness to contend for an unlicensed channel in the crowded environment.

Even with the configured UL scheduling, if the configured UL grant in a scheduling period is not enough to empty the data buffer at the UE, the rest data transmission still needs to wait for another transmission window, which may also be subject to another LBT success. Besides, the period of the configured UL grant may be large, which may introduce longer delay.

Figure 2B:
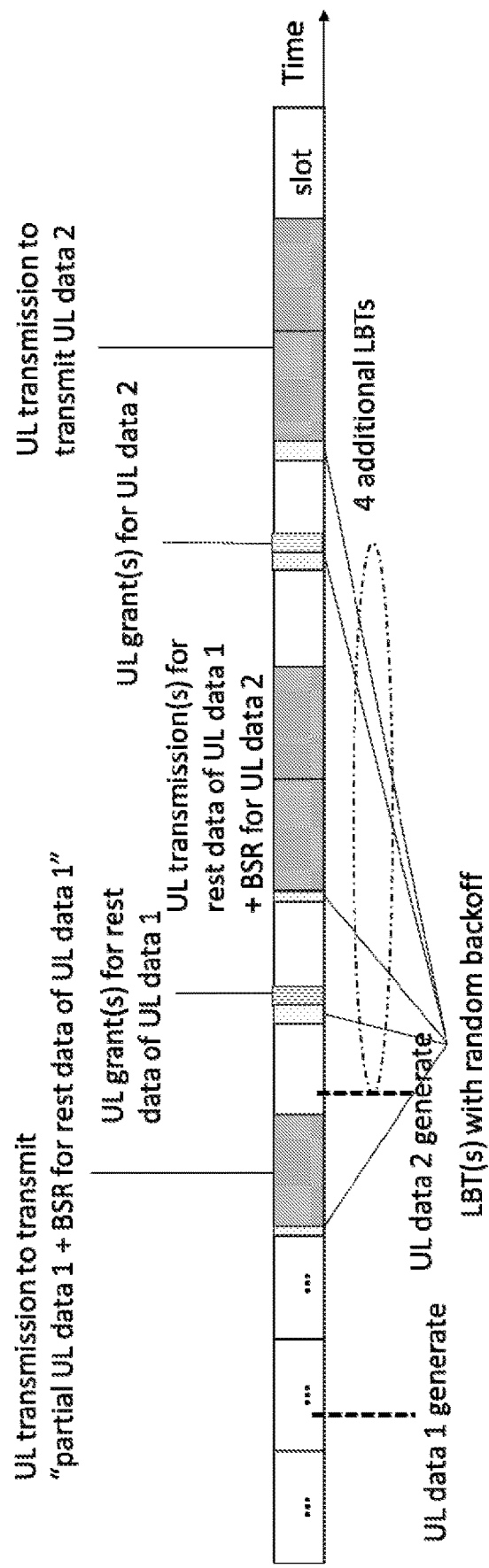
FIG. 2B is a diagram illustrating another example of UL scheduling on the unlicensed band according to some embodiments of the present disclosure.

FIG. 2B is a diagram illustrating another example of UL scheduling on the unlicensed band according to some embodiments of the present disclosure. In this example, a gNB does not know the exact status of a data buffer at a UE and there may be a buffer status mismatch between the gNB and the UE based on a BSR. For example, after the reception of the BSR from the UE, the gNB can maintain the buffer status for the UE according to the UL data transmission results of the UE. However, the gNB may still not know the exact UE buffer status due to multiple reasons, for example, a BS level truncation error upon BSR generation, new data (such as service data, acknowledgement message, etc.) arrival after BSR transmission, medium access control (MAC) control element (CE) (such as power headroom report (PHR), BSR, etc.) addition, BSR transmission error, and etc. For any of these cases, insufficient UL grant may occur for the UE. On the other hand, additional LBTs may also be caused due to non-predictable change of the data buffer at the UE.

As shown in FIG. 2B, the UE may have some UL urgent data with low latency requirement. The UL grants scheduled by the gNB may not be enough for the UE to completely transmit a UL data burst (i.e., UL data 1) generated at the UE. In this case, the UE performs UL transmission to transmit partial UL data 1 and a BSR for rest data of UL data 1. After the gNB detects the BSR, it can send UL grant(s) for the rest data of UL data 1 to the UE. However, after the scheduling action in the gNB, UL data 2 is generated at the UE and the UL grants available for scheduling UL data 1 are not enough to accommodate both UL data 1 and UL data 2. The UE only can carry another BSR along with the rest data of UL data 1 in the UL transmission to let the gNB to schedule UL data 2. Then the same UL scheduling procedure is repeated, i.e. the gNB sends UL grant(s) for UL data 2 and the UE transmits UL data 2 by using the UL grant(s).

There may be considerable delay for UL data transmissions because the gNB may not be able to schedule enough UL grants based on the exact status of the data buffer at the UE. This may result in not only long delay for data transmission but also increase the number of LBTs for the UE to transmit UL data. For example, there may be an interval between the neighboring UL transmissions of the UE, thus the UE needs to perform LBT upon each transmission start. For the example as shown in FIG. 2B, the UE needs to perform 4 additional LBTs for the UL data transmissions. If the intended channel is already taken by another device, the UE needs to wait for even longer time.

Figure 2C:
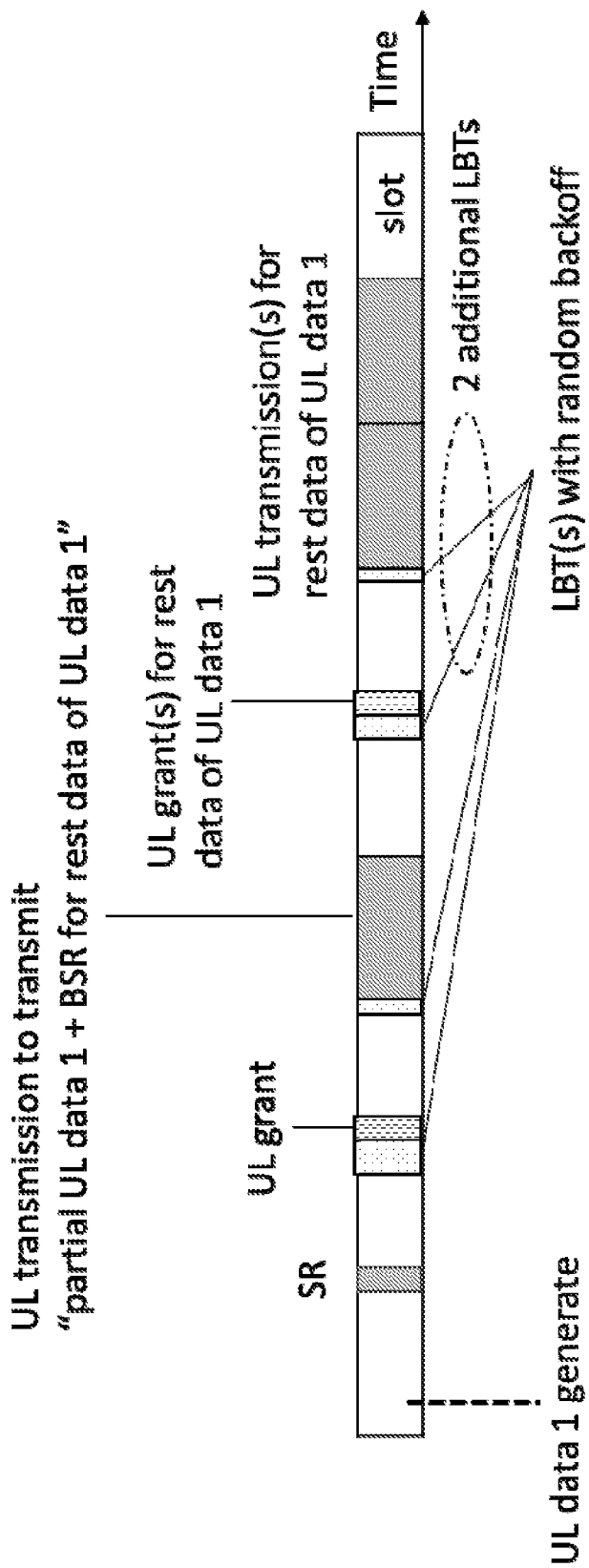
FIG. 2C is a diagram illustrating a further example of UL scheduling on the unlicensed band according to some embodiments of the present disclosure.

FIG. 2C is a diagram illustrating a further example of UL scheduling on the unlicensed band according to some embodiments of the present disclosure. In this example, a gNB does not know the exact status of a data buffer at a UE and there may be a buffer status mismatch between the gNB and the UE based on a SR. As shown in FIG. 2C, upon the reception of the SR from the UE, the gNB can only determine that the UE has UL data (i.e., UL data 1) waiting for transmission. However, the gNB cannot determine the amount of buffered data at the UE. So the gNB sends an initial UL grant to the UE. The initial UL grant may not be enough for the UE to completely transmit UL data 1. Then the UE uses the initial UL grant to transmit partial UL data 1 together with a BSR for rest data of UL data 1. Only when the BSR is decoded, the gNB can know the exact buffer status in the UE side and determine whether to send further UL grant(s) to the UE. For the example as shown in FIG. 2C, the gNB determines to send the subsequent UL grant for the rest data of UL data 1. The UE can perform UL transmission for the rest data of UL data 1 by using the subsequent UL grant.

According to the procedure as shown in FIG. 2C, there is an interval (which includes PUSCH decoding delay in the gNB, scheduling delay in the gNB, PDCCH transmission delay in the gNB, PDCCH decoding delay in the UE and PUSCH encoding delay in the UE) between the PUSCH transmissions using the initial UL grant and the subsequent UL grant according to the decoded BSR. The gNB needs to perform another LBT for transmitting the subsequent UL grant to the UE and the UE also needs to perform another LBT for PUSCH transmission according to the subsequent UL grant. Therefore, additional BSR and the corresponding LBTs may be introduced for the UL data transmissions due to that the gNB does not know exact UE buffer status upon reception of the SR from the UE. This may result in the long delay and the weakness to use the unlicensed channel for burst data transmission. It can be appreciated that although a possible LBT failure is not illustrated in FIGS. 2B-2C, if the intended channel is taken by other radio device, the UE may take much longer time to acquire the channel to empty the data buffer, which means the reduced system capacity and the long transmission delay.

In order to enhance the channel contention and improve the latency performance of the legacy dynamic or configured UL scheduling scheme, the present disclosure according to some exemplary embodiments proposes to configure self-scheduling capability at a UE, instead of relying on the BS scheduled UL transmission only. According to the proposed solution, after UL transmission(s) scheduled or granted by the serving BS, the UE can schedule further UL data transmission(s) by itself according to a predefined rule without waiting for further UL grant(s) from the BS, if the UL transmission(s) scheduled by the BS is insufficient to empty the buffered data at the UE. The proposed solution may be applicable for licensed operation (i.e., data transmission on a licensed carrier) and/or unlicensed operation (i.e., data transmission on an unlicensed carrier), although it may be especially attractive for the unlicensed operation since the proposed self-scheduling scheme can reduce the risk of losing a channel due to additional LBTs.

In accordance with an exemplary embodiment, the self-scheduling scheme may be configured for burst data transmission where the BSR delay may clearly impact the transmission performance. Optionally, the self-scheduling scheme may be used for small data (such as a transmission control protocol/radio link control feedback message) transmission. Alternatively or additionally, the self-scheduling scheme may be used for UL data transmissions in a sharable resource unit (such as an unlicensed carrier), so as to reduce the number of needed LBT attempts and the latency of UL data transmission.

Figure 3A:
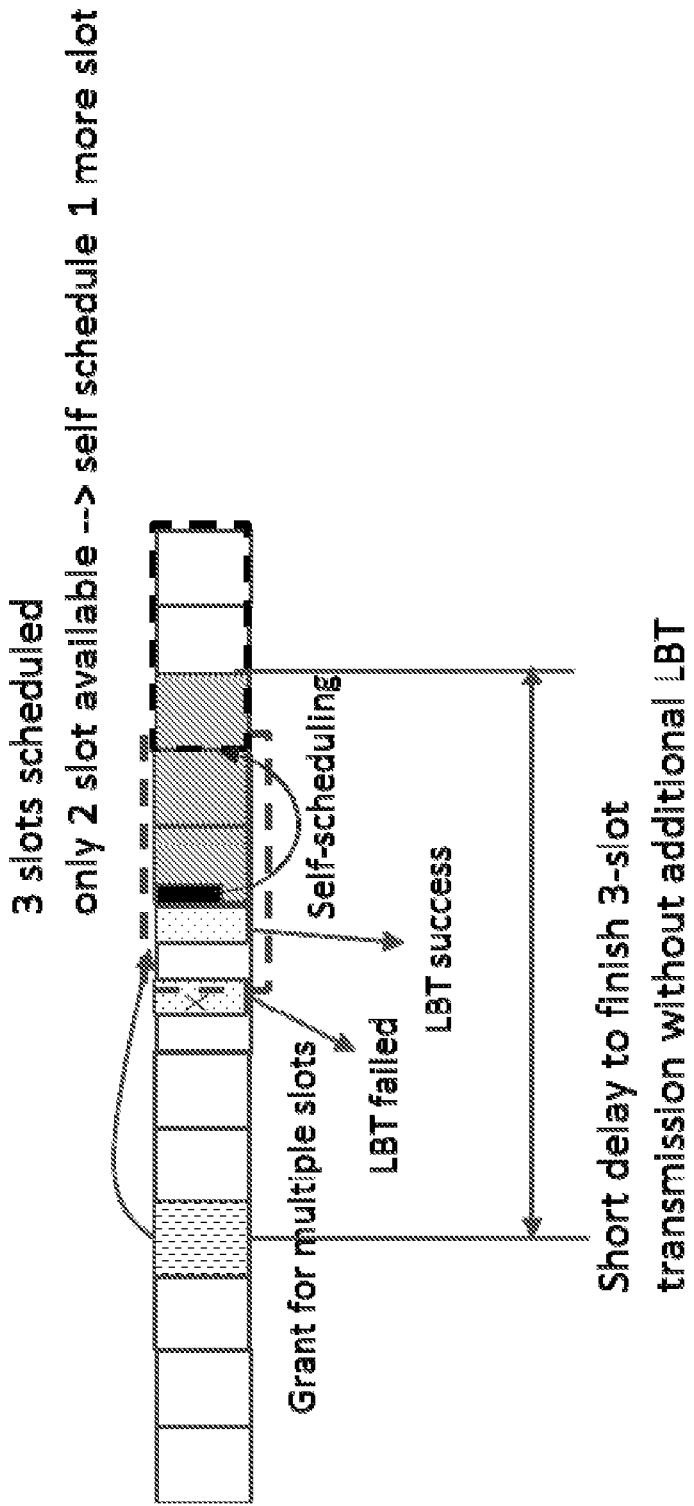
FIG. 3A is a diagram illustrating an example of self-scheduling according to some embodiments of the present disclosure.

FIG. 3A is a diagram illustrating an example of self-scheduling according to some embodiments of the present disclosure. In this example, a BS such as gNB can perform a self-scheduling configuration to let a UE know whether self-scheduling is enabled and how to schedule UL data transmission by the UE. In accordance with an exemplary embodiment, the self-scheduling configuration may include an on/off indicator of the self-scheduling capability, a self-scheduling resource determination scheme and other transmission parameters (such as MCS, rank, precoding matrix, transmit power and etc.). The UE can perform self-scheduling according to the configuration provisioned by the BS and the buffer status of the UE.

As shown in FIG. 3A, the BS may schedule a UL grant for multiple slots (e.g., 3 slots) to the UE. However, there may be only a part of the granted slots (e.g., 2 slots) available for the UE to transmit UL data, for example, due to an LBT failure. In the case that the available slots are insufficient to empty the UL data buffered at the UE and the UE has the self-scheduling capability, the UE may generate and transmit a self-scheduling message to the BS to inform the BS that the UE schedules 1 more slot to transmit the rest part of the UL data. Optionally, the self-scheduling message may be transmitted to the BS together with the UL data scheduled by the BS. Correspondingly, the BS can detect the self-scheduling message from the UE and decode the UL data accordingly. Compared to FIG. 2A, the UE can finish the UL data transmissions in 3 slots by using the self-scheduling as illustrated in FIG. 3A, without performing additional LBT.

It will be realized that self-scheduling may still be a network control scheme, which can be triggered based at least in part on some preconfigured conditions. For example, the self-scheduling may be triggered in response to that the dynamic grant scheduled by the BS is not enough to carry all buffered data at the UE. Alternatively, the self-scheduling may be triggered in the case that there is an active configured grant available but the configured grant is not enough to carry all buffered data at the UE. It can be appreciated that the self-scheduling may be regarded as an enhanced dynamic scheduling scheme which can be performed jointly by the BS and the UE.

Figure 3B:
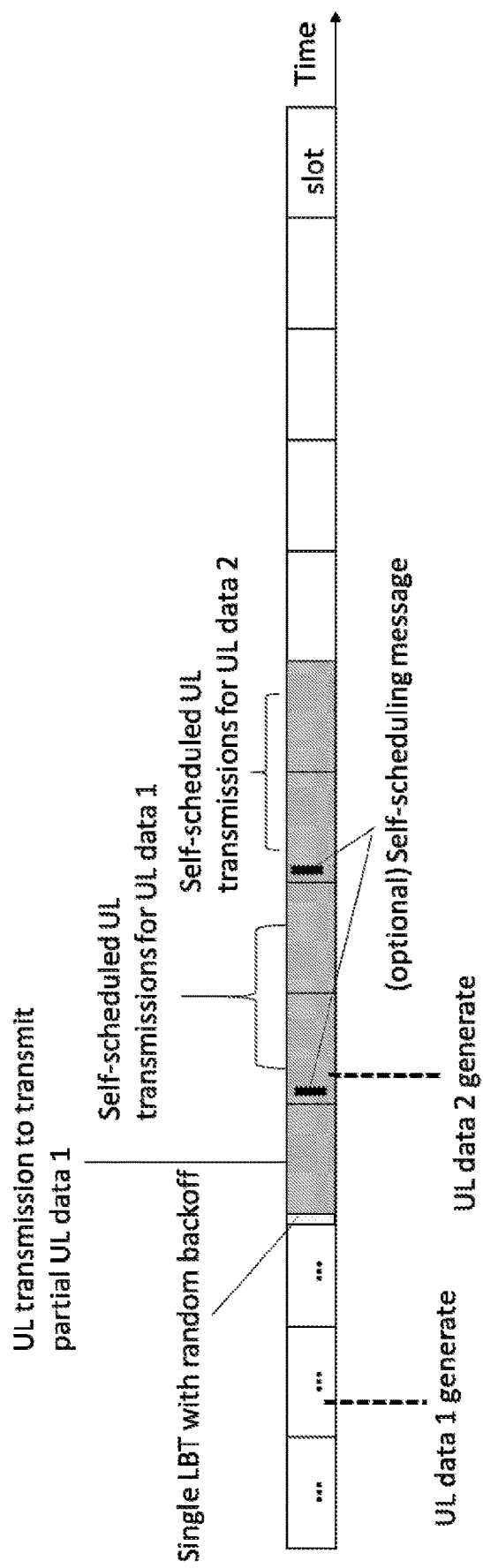
FIG. 3B is a diagram illustrating another example of self-scheduling according to some embodiments of the present disclosure.

FIG. 3B is a diagram illustrating another example of self-scheduling according to some embodiments of the present disclosure. In this example, the exact status and/or status change of a data buffer at a UE is unknown to a BS such as gNB and thus an UL grant received by the UE from the BS can only be used to transmit partial UL data 1. If the UE is configured with the self-scheduling capability, the UE can optionally perform self-scheduled UL transmission for the rest of UL data 1, without sending a BSR for the rest of UL data 1 to the BS. In the case that UL data 2 is generated at the UE after the scheduling action in the BS, the UE can further initiate self-scheduled UL transmission for UL data 2 subsequent to the self-scheduled UL transmission for the rest of UL data 1. Optionally, the UE may transmit a self-scheduling message to the BS at the beginning of the respective self-scheduled UL transmissions. By initiating the self-scheduled UL transmissions, the UE does not need to wait for further UL grant(s) configured by the BS, so that the related control signaling overhead (e.g., for the SR and UL grant) can be saved. In the case that the sharable resource unit (such as an unlicensed carrier) is used, the self-scheduling scheme can avoid the risk of losing a channel due to additional LBT attempts. For example, compared with the example as shown in FIG. 2B, 4 additional LBTs are saved by the self-scheduling scheme as illustrated in FIG. 3B.

Figure 3C:
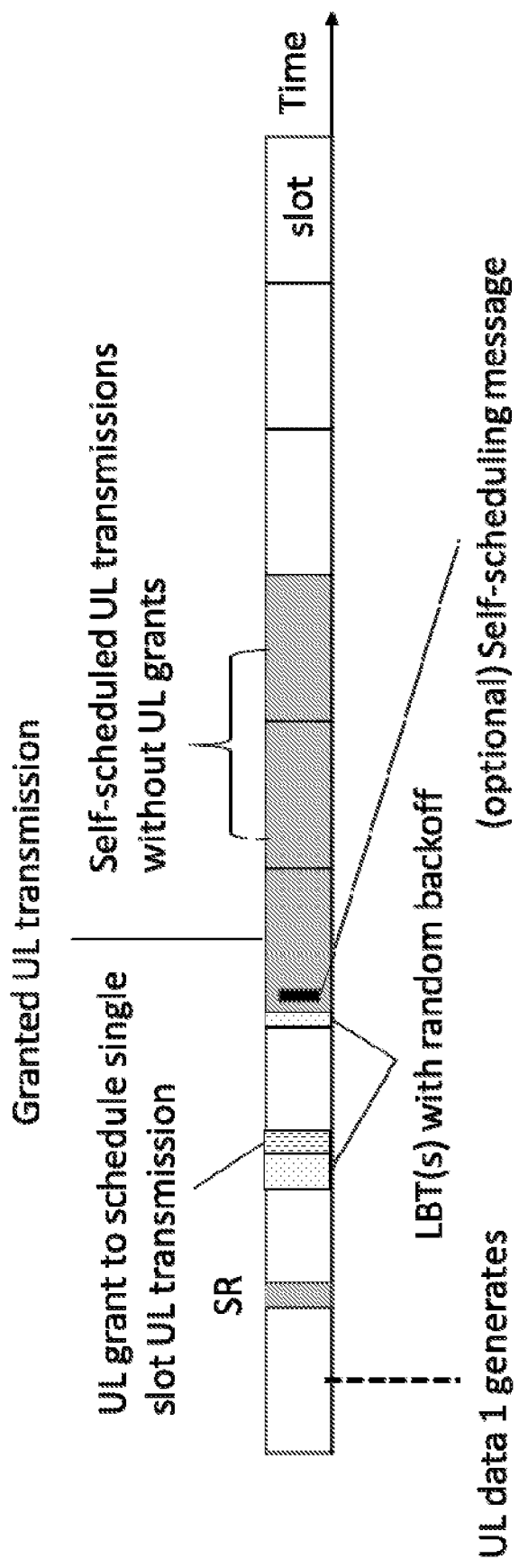
FIG. 3C is a diagram illustrating a further example of self-scheduling according to some embodiments of the present disclosure.

FIG. 3C is a diagram illustrating a further example of self-scheduling according to some embodiments of the present disclosure. Similar to the example as shown in FIG. 2C, upon the reception of a SR from a UE, a BS such as gNB may only be aware of that the UE has UL data waiting for transmission, but cannot determine the amount of buffered data at the UE. So the gNB configures a UL grant to schedule a single slot UL transmission of the UE. In the case that the granted UL transmission cannot empty the UE buffer and the UE is capable of self-scheduling, the UE can schedule the remaining data in the buffer by itself, instead of requesting for further UL grants using a SR or a BSR. Optionally, the UE may include a UL scheduling message in the granted UL transmission which is scheduled by the BS, and transmit the scheduled data accordingly. In the self-scheduled UL transmission, the UE may use the same transmission parameters as those applied to the granted UL transmission, such as frequency resource, rank, precoding matrix, numerology, MCS and MCS table, power control and etc. Optionally, the UE can also choose different frequency resource from that used in the granted UL transmission. Compared to FIG. 2C, 2 additional LBTs due to insufficient UL grant(s) to empty the buffer at the UE are saved via the self-scheduling scheme as illustrated in FIG. 3C.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 4:
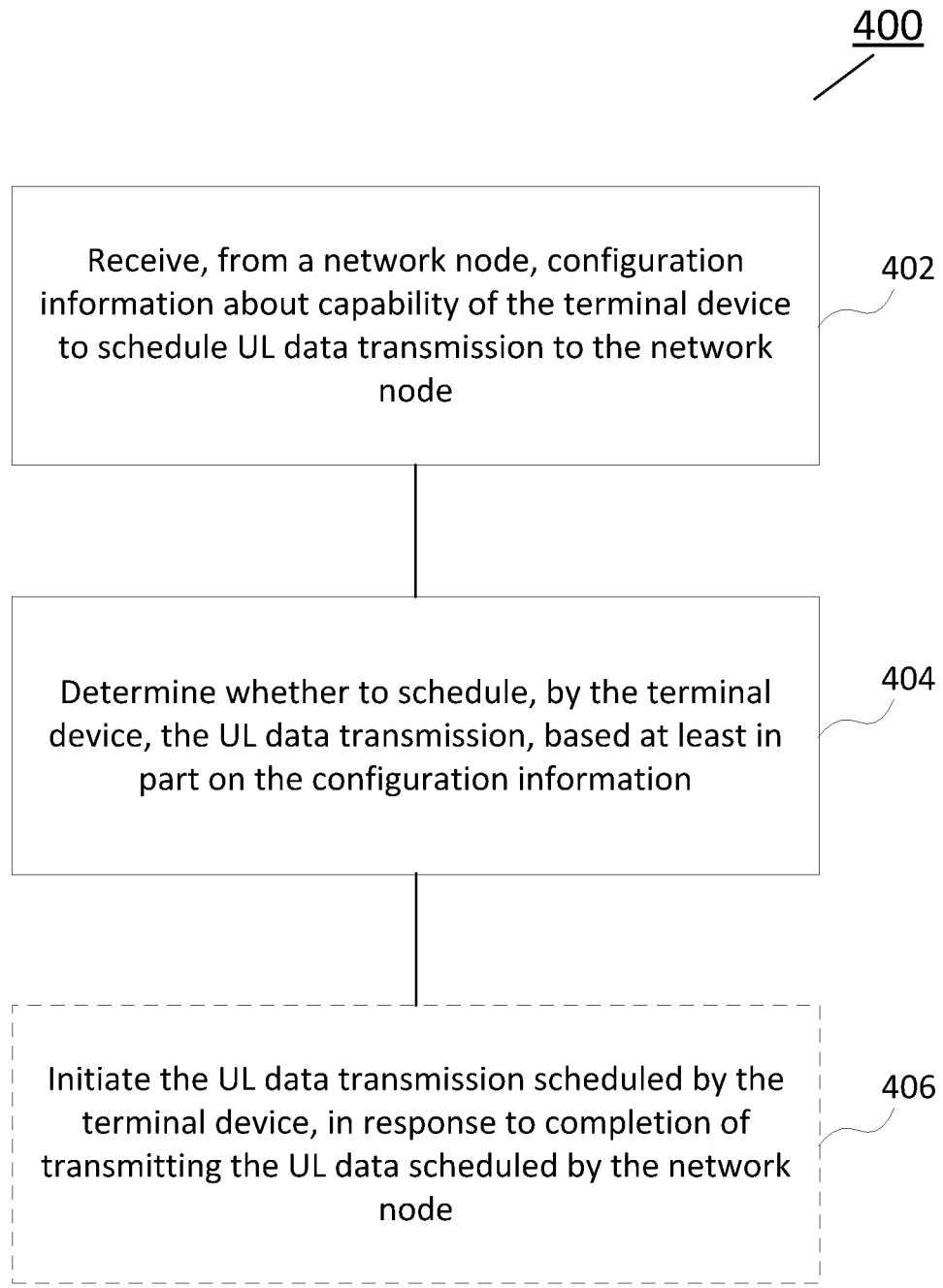
FIG. 4 is a flowchart illustrating a method according to some embodiments of the present disclosure.

FIG. 4 is a flowchart illustrating a method 400 according to some embodiments of the present disclosure. The method 400 illustrated in FIG. 4 may be performed by an apparatus implemented in a terminal device or communicatively coupled to a terminal device. In accordance with an exemplary embodiment, the terminal device such as UE may be configured with some radio resource in the licensed band and/or the unlicensed band by a network node such as a BS to schedule UL transmission.

According to the exemplary method 400 illustrated in FIG. 4, the terminal device may receive, from a network node, configuration information about capability of the terminal device to schedule UL data transmission to the network node, as shown in block 402. In accordance with some exemplary embodiments, the configuration information may be included in at least one of: radio resource control (RRC) signaling, a medium access control layer control element (such as MAC CE) for the terminal device, and downlink control information (DCI). Optionally, the terminal device may be configured with self-scheduling capability dynamically (e.g., for a certain period of time), in response to reception of the configuration information. Alternatively or additionally, the configuration information may explicitly comprise an indicator of whether to enable or disable the capability of the terminal device to schedule the UL data transmission.

According to an exemplary embodiment, the network node such as a BS can configure self-scheduling information to let a UE know whether the self-scheduling capability/function is enabled and how to schedule the UL data transmission by the UE. The configured self-scheduling information may include a self-scheduling allowance on/off indicator to let the UE know whether it is allowed to enable the self-scheduling capability. This indicator may be semi-statically configured for the UE by RRC signaling or a MAC CE. In this case, the self-scheduling capability may be the UE-specific function and can be updated with slow cycle. Alternatively or additionally, this indicator may also be transmitted using a specific field of PDCCH carrying the UL grant. In this case, the allowance of self-scheduling capability can be turned on/off more dynamically according to the traffic situation of the BS and/or the UE.

In accordance with some exemplary embodiments, the configuration information about the self-scheduling capability of the terminal device may indicate at least one of: one or more radio resource units available for the UL data transmission, one or more configuration schemes applicable to the UL data transmission, and a maximum time duration allowed for the UL data transmission. Optionally, the one or more radio resource units available for the UL data transmission may comprise at least one radio resource unit (such as an unlicensed carrier) sharable by the terminal device and one or more other terminal devices.

According to an exemplary embodiment, the configuration information about the self-scheduling capability of the terminal device such as UE can carry one or more self-scheduling parameters from a BS, such as a frequency resource parameter, a time period parameter, and/or some transmission parameters. The frequency resource parameter may be predefined by the BS so that the UE can use the same frequency resource as the neighboring granted UL transmission. Alternatively, the BS can predefine a resource pool for the UE to perform the self-scheduled UL data transmission (e.g., PUSCH transmission). The time period parameter may be configured to indicate the maximum number of transmissions, slots or any other time units (such as mini-slots, milliseconds, subframes, etc.) that the UE is allowed to perform the self-scheduled PUSCH transmission. In an exemplary embodiment, after receiving a dynamic UL grant from the BS, the UE may optionally use the same transmission parameters in the subsequent self-scheduled transmission as those configured in the dynamic UL grant. The transmission parameters may indicate at least one of frequency allocation, MCS and MCS table, transmission rank, a precoding matrix, etc.

According to the exemplary method 400 illustrated in FIG. 4, the terminal device can determine whether to schedule, by the terminal device, the UL data transmission, based at least in part on the configuration information, as shown in block 404. The configuration information may indicate, implicitly or by default, the allowance of self-scheduling capability to the terminal device, for example, by some resource allocation and transmission parameters in the configuration information. Alternatively, the terminal device may be explicitly informed, for example, by the self-scheduling allowance on/off indicator in the configuration information, that the self-scheduling capability is enabled or disabled. In the case that the terminal device is capable of scheduling the UL data transmission, the terminal device can determine whether radio resource granted by the network node is enough to empty UL data buffered at the terminal device. The granted radio resource may be available for the terminal device to transmit UL data scheduled by the network node. In response to the determination that the granted radio resource is not enough to empty the UL data buffered at the terminal device, the terminal device can determine to schedule the UL data transmission by the terminal device.

In accordance with some exemplary embodiments, the terminal device such as UE can check whether the configuration information received from a BS enables or disables the self-scheduling capability of the UE. If the allowance of self-scheduling capability for the UE is off, the UE may process UL transmissions according to the legacy procedure. In this case, the UE can use the granted resource to transmit UL data scheduled by the BS and optionally a BSR if there is still UL data waiting for transmission. If the allowance of self-scheduling capability for the UE is on, the UE may check whether the granted resource for the UL data scheduled by the BS is enough to empty the buffered UL data. If the granted resource is enough, the UE may not perform the self-scheduling of UL transmission. Otherwise, the UE may decide to schedule the UL data by itself. Optionally, the decision of self-scheduling the UL data by the UE can be made based at least in part on one or more other predefined conditions. For example, the UE may determine to initiate the self-scheduled data transmission only for a certain service (e.g., a service data flow with a predefined quality class). Alternatively or additionally, the UE may determine to initiate the self-scheduled transmission if all buffered data can be transmitted with the self-scheduled transmission (i.e., the buffer at the UE can be emptied after the self-scheduled transmission).

According to the exemplary method 400 illustrated in FIG. 4, the terminal device may optionally initiate the UL data transmission scheduled by the terminal device, in response to completion of transmitting the UL data scheduled by the network node, as shown in block 406. In accordance with some exemplary embodiments, the terminal device may schedule the UL data transmission based at least in part on a transmission configuration of the UL data scheduled by the network node. For example, the terminal device may transmit the self-scheduled UL data by using the same radio resource and/or transmission parameters as those used for the UL data transmission scheduled by the network node. Alternatively, the terminal device can estimate the amount of radio resource that needs to be obtained from the preconfigured resource pool, and use proper radio resource and parameter settings to schedule the UL data transmission.

In accordance with some exemplary embodiments, the terminal device may generate a scheduling message based at least in part on the configuration information received from the network node. The scheduling message may be transmitted to the network node (e.g., prior to or during the UL data transmission scheduled by the terminal device) to indicate scheduling of the UL data transmission by the terminal device. Optionally, the scheduling message may be transmitted by the terminal device upon transmission of the UL data scheduled by the network node (e.g., at the beginning of the granted resource for the UL data scheduled by the network node). According to an exemplary embodiment, the scheduling message may be carried in uplink control information (UCI) and/or a MAC layer control element for the network node. The scheduling message may indicate one or more radio resource units, a time duration and/or a configuration scheme for the UL data transmission scheduled by the terminal device.

According to an exemplary embodiment, the terminal device such as UE can notify a BS of the self-scheduled transmission by sending the corresponding self-scheduling message multiplexed in the first PUSCH or carried via PUCCH, so that the BS can prepare the UL data reception and adapt the scheduling behavior. The self-scheduling message may contain one or more of parameters to indicate the coming UL burst data transmission, the time duration (e.g., the number of slots) and/or frequency range of the self-scheduled transmission. A MAC CE may be defined to carry the self-scheduling message. Optionally, the MAC CE carrying the self-scheduling message may be placed ahead of the service data packets so that the BS can detect the self-scheduling message as early as possible. Alternatively, a dedicated PUCCH resource can be configured to carry the self-scheduling message. In an exemplary embodiment, the self-scheduling message may be aggregated with the HARQ UCI feedback over the pre-allocated resource and the self-scheduled UL data can be transmitted immediately in parallel or after the UCI transmission.

Figure 5:
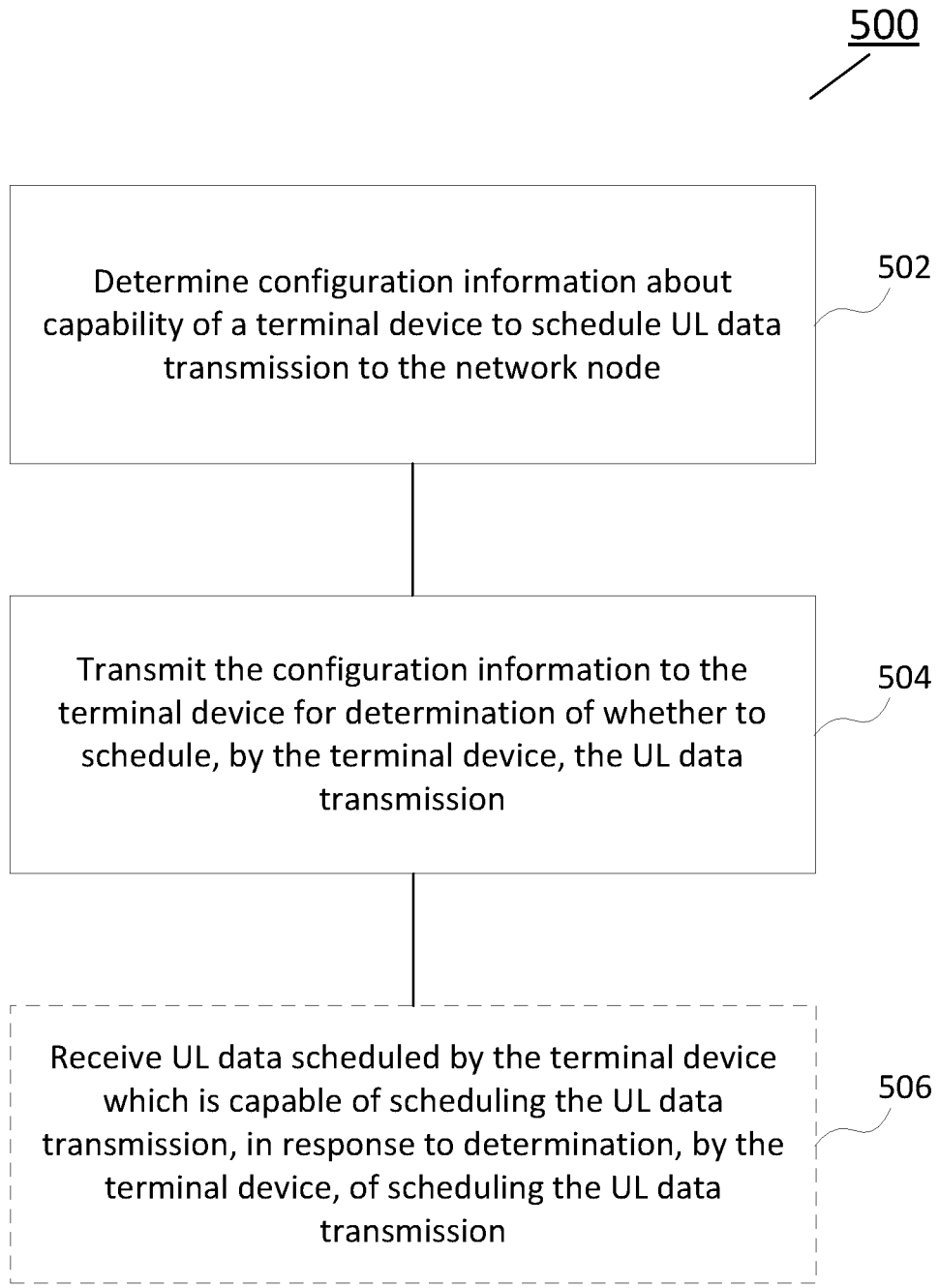
FIG. 5 is a flowchart illustrating another method according to some embodiments of the present disclosure e.

FIG. 5 is a flowchart illustrating another method 500 according to some embodiments of the present disclosure. The method 500 illustrated in FIG. 5 may be performed by an apparatus implemented in a network node or communicatively coupled to a network node. In accordance with an exemplary embodiment, the network node may comprise a BS such as eNB/gNB. The network node can configure radio resources for a terminal device such as UE to schedule UL transmission.

According to the exemplary method 500 illustrated in FIG. 5, the network node can determine configuration information about capability of a terminal device to schedule UL data transmission to the network node, as shown in block 502. Optionally, the configuration information may comprise an indicator of whether to enable or disable the self-scheduling capability of the terminal device. The network node can transmit the configuration information to the terminal device for determination of whether to schedule, by the terminal device, the UL data transmission, as shown in block 504. For example, the network node may include the configuration information in RRC signaling, a MAC CE and/or DCI, so as to inform the terminal device of radio resource, configuration scheme and/or allowable time duration available for the self-scheduled UL data transmission.

Optionally, the network node may receive UL data scheduled by the terminal device which is capable of scheduling the UL data transmission, in response to determination, by the terminal device, of scheduling the UL data transmission, as shown in block 506. According to an exemplary embodiment, the determination of scheduling the UL data transmission may be made by the terminal device in response to determination that radio resource granted by the network node is not enough to empty UL data buffered at the terminal device. Optionally, the determination of self-scheduling may be made by the terminal device further in response to that the self-scheduled transmission is related to a service with a predefined quality class, and/or that the self-scheduled transmission can enable the UL data buffered at the terminal device to be emptied.

In accordance with some exemplary embodiments, the network node may receive a scheduling message from the terminal device to indicate the scheduling of the UL data transmission by the terminal device. The scheduling message may be received by the network node upon reception of UL data scheduled by the network node. Based at least in part on the received scheduling message, the network node can decode the UL data scheduled by the terminal device and adapt the scheduling behavior. In the case that no scheduling message is transmitted by the terminal device but a default configuration is applied to the self-scheduled transmission, the network node can process the UL data scheduled by the terminal device according to the default configuration.

In accordance with some exemplary embodiments, the network node may preconfigure one or more radio resource units (also known as self-scheduling grant/resource) for the terminal device to perform self-scheduling. Optionally, the one or more radio resource units may comprise at least one radio resource unit sharable by the terminal device and one or more other terminal devices. According to an exemplary embodiment, the network node can determine that at least one radio resource unit available for the UL data transmission self-scheduled by the terminal device is unused. In this case, the network node may use the at least one unused radio resource unit to schedule data transmissions (e.g., for UL data and/or DL data).

Figure 6:
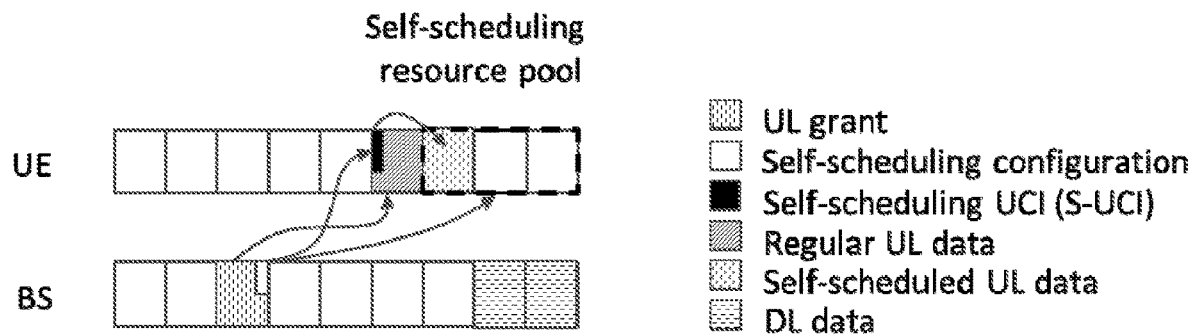
FIG. 6 is a diagram illustrating an example of resource utilization according to some embodiments of the present disclosure.

FIG. 6 is a diagram illustrating an example of resource utilization according to some embodiments of the present disclosure. In this example, a BS transmits a self-scheduling configuration in an UL grant to a UE. According to the self-scheduling configuration, the UE can determine a resource pool configured for self-scheduling. In the case that the UE enables the self-scheduling capability for UL transmission, the BS may receive self-scheduling UCI (S-UCI) from the UE together with regular UL data which is scheduled by the BS using the UL grant. In addition, the BS may also receive self-scheduled UL data using the self-scheduling resource. By detecting the self-scheduling resource, the BS can determine whether the resource in the configured resource pool is self-scheduled by the UE. If no resource is self-scheduled by the UE, the BS decodes the regular UL data in the UL grant only. Alternatively, if there is UL data self-scheduled by the UE, the BS can decode the regular UL data in the UL grant and the self-scheduled UL data in the self-scheduled resource.

In order to enhance the efficiency of resource utilization, the BS may estimate the amount of remaining resource with respect to the resource budget after the self-scheduled UL transmission. Based at least in part on a result of the estimation, the BS can adapt scheduling dynamically to allocate the remaining resource flexibly. According to an exemplary embodiment, the BS can prepare to schedule DL data or UL data in the remaining resource. For the example as shown in FIG. 6, the remaining two slots in the self-scheduling resource pool are used by the BS to schedule DL data transmission. In this way, the radio resource may not be wasted from the system perspective.

In accordance with an exemplary embodiment where the unlicensed operation is supported by the network, at least a part of the self-scheduling resource configured for a first UE may also be sharable by a second UE for UL transmission. In the case that the first UE does not use a channel in the sharable resource to perform the self-scheduled UL transmission, the second UE can still have the opportunity to seize up this channel for data transmission via LBT.

The proposed solution according to one or more exemplary embodiments can enable a network node such as BS to configure the self-scheduling capability of a terminal device such as UE, so that the UE can empty its data buffer by performing the self-scheduled transmission. In the proposed solution, the UE can schedule UL data by itself according to the instant buffer status, instead of performing the legacy procedure which usually includes sending a BSR to the BS, receiving an UL grant from the BS and transmitting UL data using the UL grant. Taking advantageous of the proposed self-scheduling solution can improve the latency performance of UL transmission, reduce the number of LBTs to empty a buffer and enhance channel occupation. On the other hand, there may be no waste of radio resource due to that the BS can schedule other data transmissions by using some unused self-scheduling resource.

The various blocks shown in FIGS. 4-5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 7:
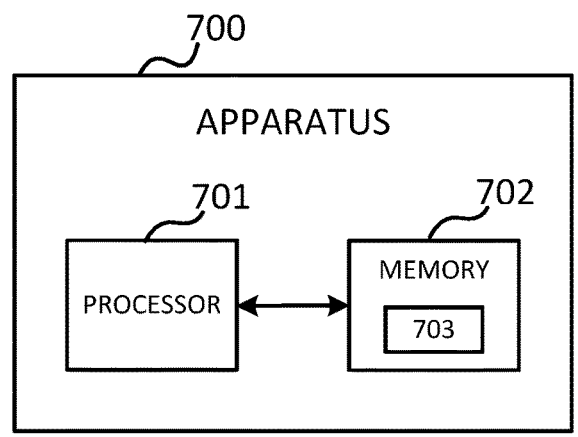
FIG. 7 is a block diagram illustrating an apparatus according to some embodiments of the present disclosure.

FIG. 7 is a block diagram illustrating an apparatus 700 according to various embodiments of the present disclosure. As shown in FIG. 7, the apparatus 700 may comprise one or more processors such as processor 701 and one or more memories such as memory 702 storing computer program codes 703. The memory 702 may be non-transitory machine/processor/computer readable storage medium. In accordance with some exemplary embodiments, the apparatus 700 may be implemented as an integrated circuit chip or module that can be plugged or installed into a terminal device as described with respect to FIG. 4, or a network node as described with respect to FIG. 5.

In some implementations, the one or more memories 702 and the computer program codes 703 may be configured to, with the one or more processors 701, cause the apparatus 700 at least to perform any operation of the method as described in connection with FIG. 4. In other implementations, the one or more memories 702 and the computer program codes 703 may be configured to, with the one or more processors 701, cause the apparatus 700 at least to perform any operation of the method as described in connection with FIG. 5.

Alternatively or additionally, the one or more memories 702 and the computer program codes 703 may be configured to, with the one or more processors 701, cause the apparatus 700 at least to perform more or less operations to implement the proposed methods according to the exemplary embodiments of the present disclosure.

Figure 8A:
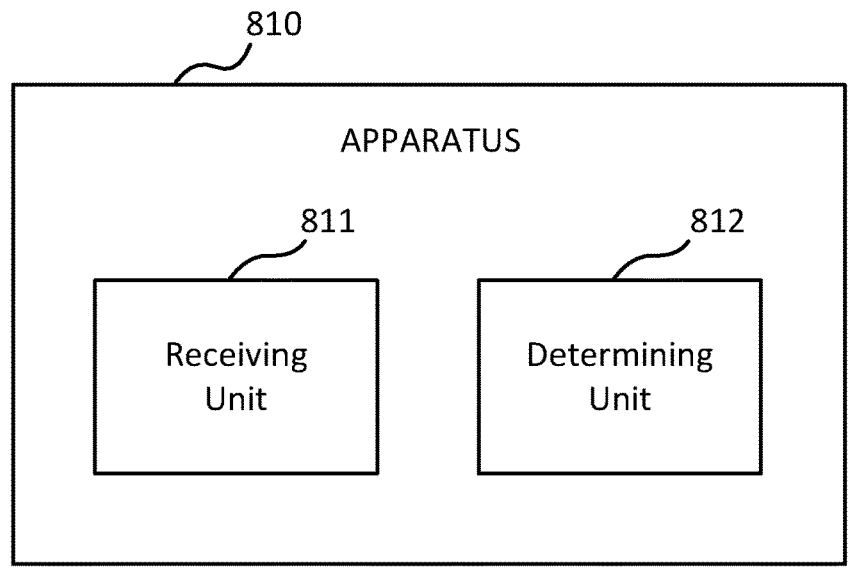
FIG. 8A is a block diagram illustrating another apparatus according to some embodiments of the present disclosure.

FIG. 8A is a block diagram illustrating an apparatus 810 according to some embodiments of the present disclosure. As shown in FIG. 8A, the apparatus 810 may comprise a receiving unit 811 and a determining unit 812. In an exemplary embodiment, the apparatus 810 may be implemented in a terminal device such as UE. The receiving unit 811 may be operable to carry out the operation in block 402, and the determining unit 812 may be operable to carry out the operation in block 404. Optionally, the receiving unit 811 and/or determining unit 812 may be operable to carry out more or less operations to implement the proposed methods according to the exemplary embodiments of the present disclosure.

Figure 8B:
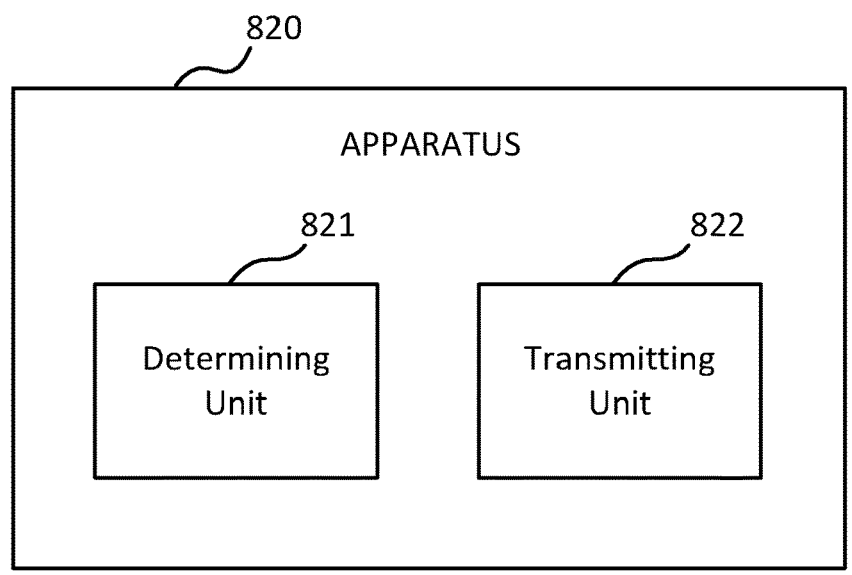
FIG. 8B is a block diagram illustrating yet another apparatus according to some embodiments of the present disclosure.

FIG. 8B is a block diagram illustrating an apparatus 820 according to some embodiments of the present disclosure. As shown in FIG. 8B, the apparatus 820 may comprise a determining unit 821 and a transmitting unit 822. In an exemplary embodiment, the apparatus 820 may be implemented in a network node such as BS. The determining unit 821 may be operable to carry out the operation in block 502, and the transmitting unit 822 may be operable to carry out the operation in block 504. Optionally, the determining unit 821 and/or the transmitting unit 822 may be operable to carry out more or less operations to implement the proposed methods according to the exemplary embodiments of the present disclosure.

Figure 9:
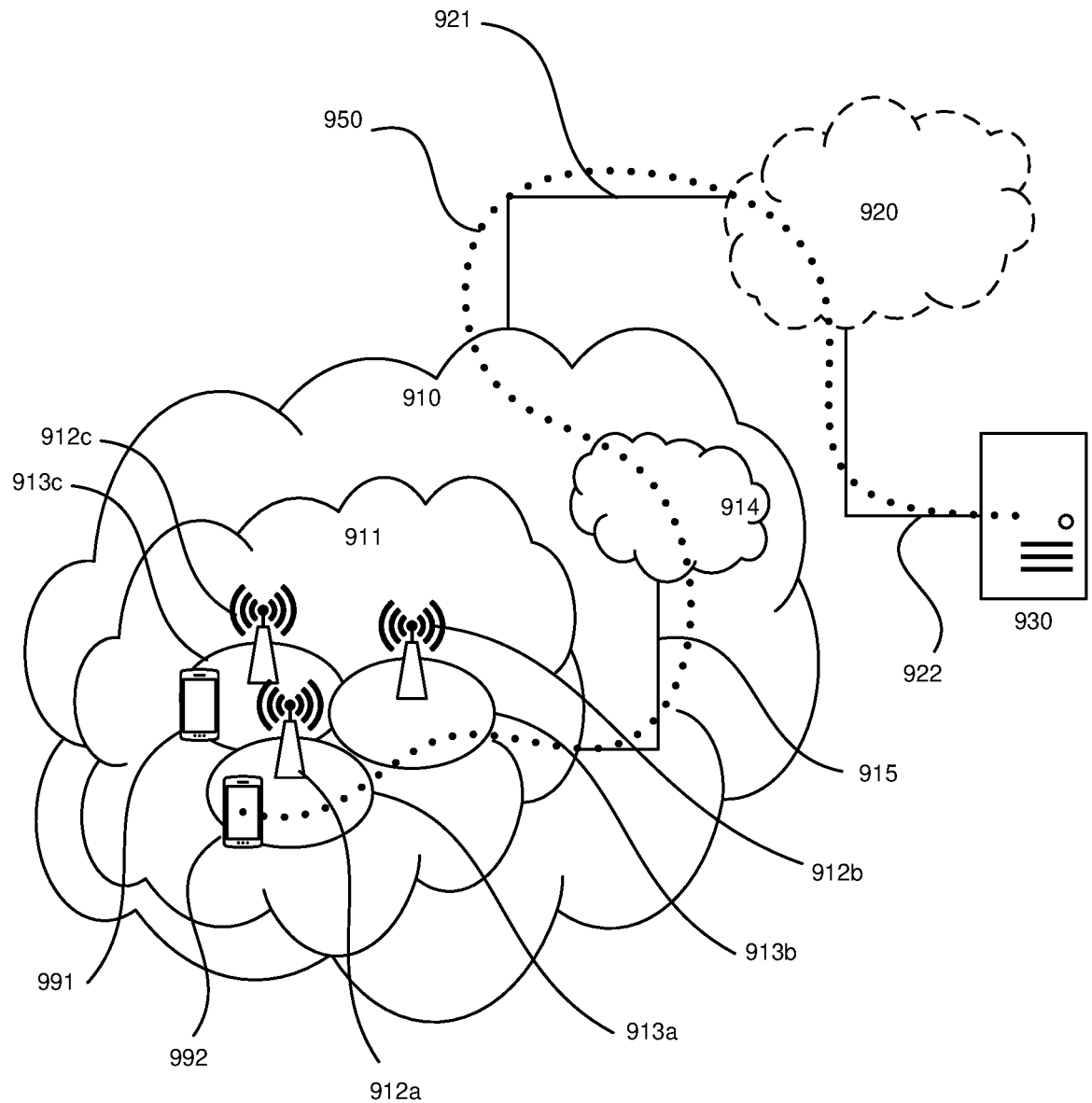
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NB s, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more subnetworks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
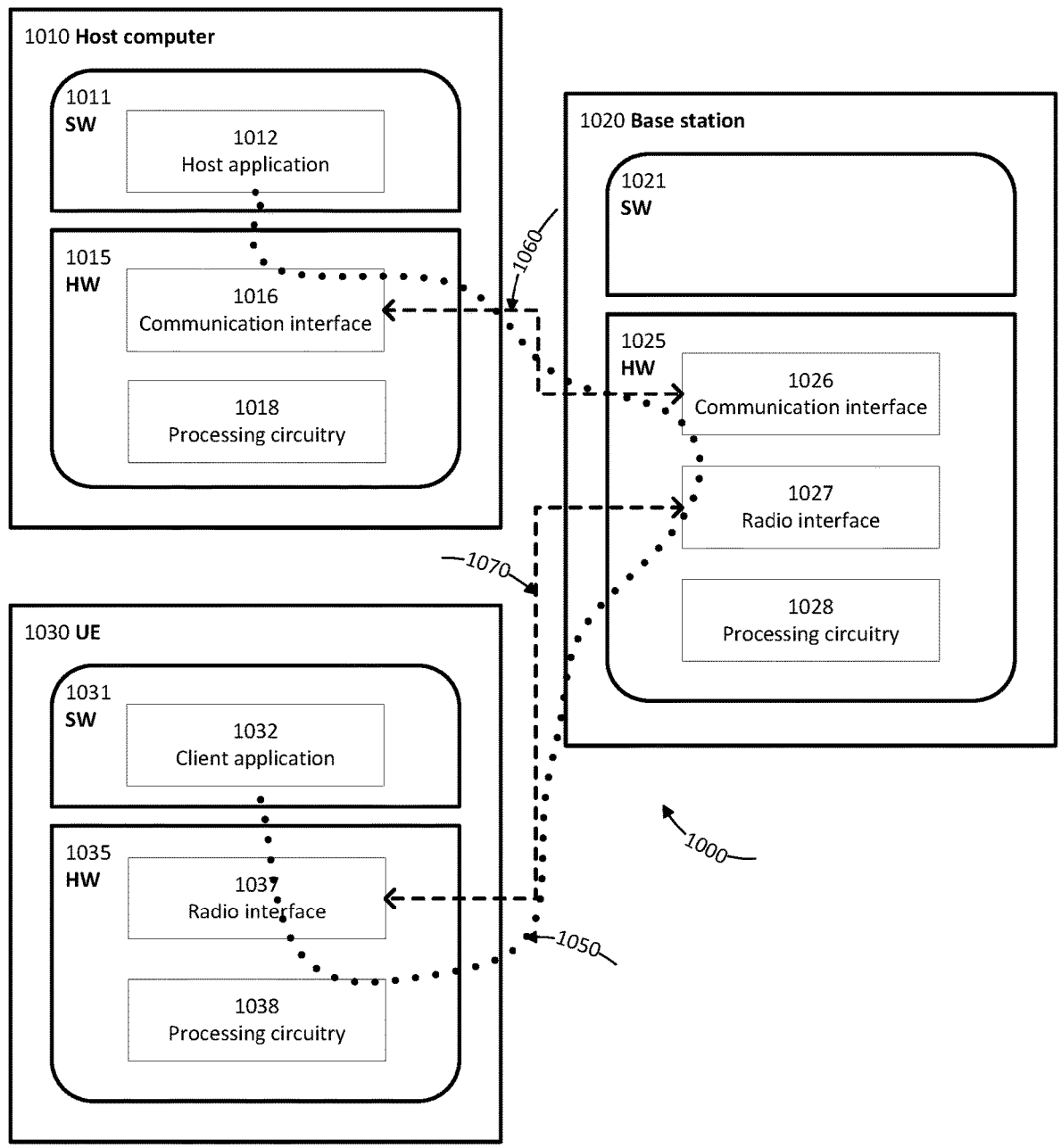
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
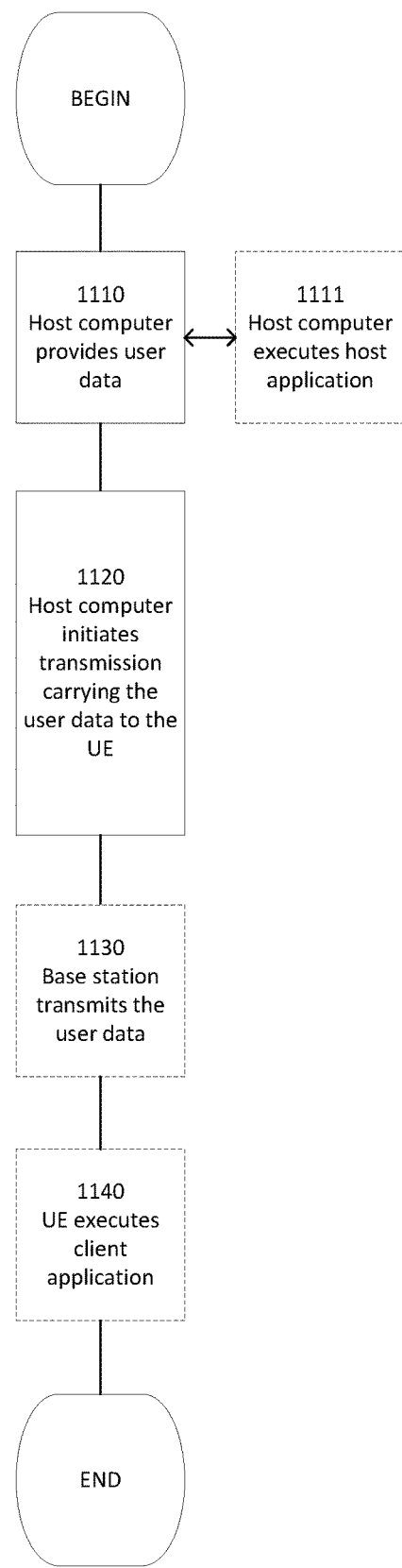
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
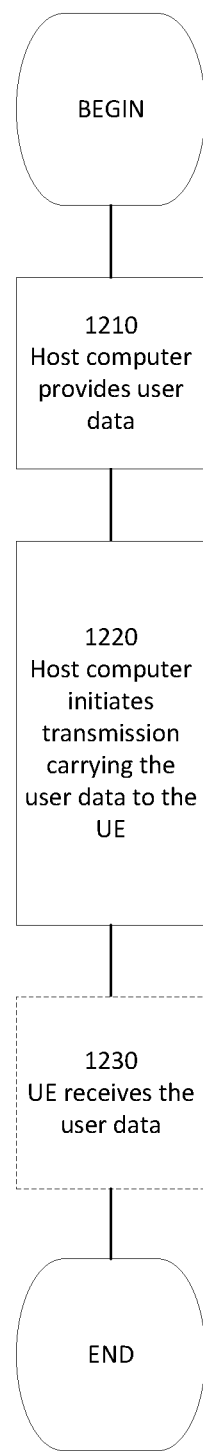
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
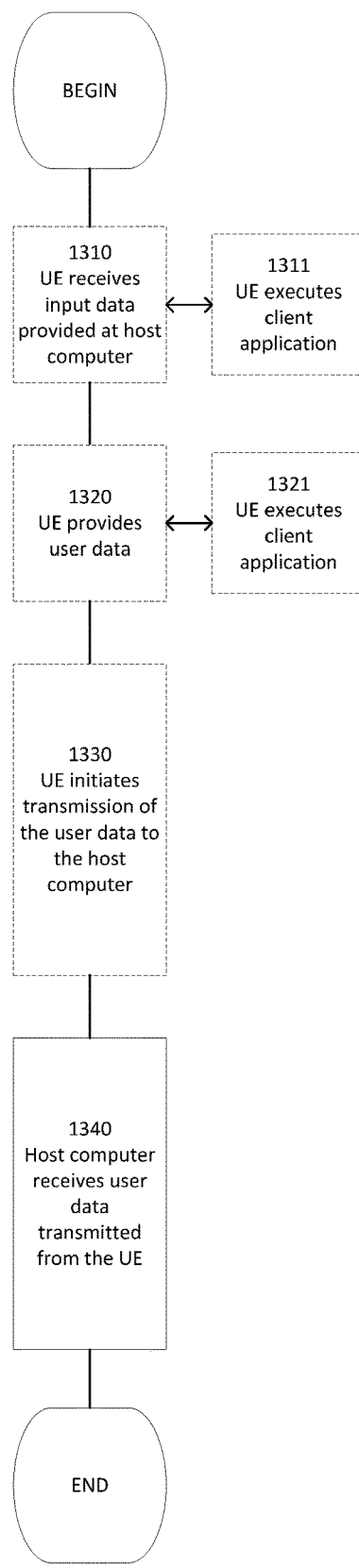
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In sub step 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
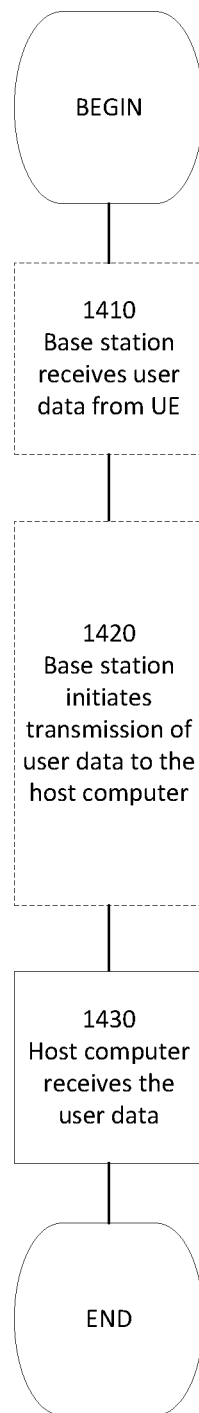
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a terminal device, comprising:
   receiving, from a network node, configuration information about capability of the terminal device to schedule uplink data transmission to the network node; and
   determining whether to schedule, by the terminal device, the uplink data transmission, based at least in part on the configuration information, the configuration information indicating at least one of:
      one or more radio resource units available for the uplink data transmission;
      one or more configuration schemes applicable to the uplink data transmission; and
      a maximum time duration allowed for the uplink data transmission; and
   the terminal device is capable of scheduling the uplink data transmission, and the determination of whether to schedule the uplink data transmission by the terminal device based at least in part on the configuration information comprising:
      determining whether radio resource granted by the network node is enough to empty uplink data buffered at the terminal device, the granted radio resource being available for the terminal device to transmit uplink data scheduled by the network node; and
      determining to schedule the uplink data transmission by the terminal device, in response to the determination that the granted radio resource is not enough to empty the uplink data buffered at the terminal device.

2. The method of claim 1, wherein the one or more radio resource units comprise at least one radio resource unit sharable by the terminal device and one or more other terminal devices.

3. The method of claim 1, wherein the configuration information comprises an indicator of whether to enable or disable the capability of the terminal device to schedule the uplink data transmission.

4. The method of claim 1, wherein the determination to schedule the uplink data transmission by the terminal device is made further in response to at least one of that:
   the uplink data transmission is for a service with a predefined quality class; and
   the uplink data transmission enables the uplink data buffered at the terminal device to be emptied.

5. The method of claim 1, further comprising:
   generating a scheduling message based at least in part on the configuration information received from the network node; and:
   transmitting the scheduling message to the network node to indicate scheduling of the uplink data transmission by the terminal device.

6. The method of claim 5, wherein the scheduling message is transmitted by the terminal device upon transmission of uplink data scheduled by the network node.

7. The method of claim 1, further comprising:
   initiating the uplink data transmission scheduled by the terminal device, in response to completion of transmitting the uplink data scheduled by the network node.

8. An apparatus implemented in a terminal device, comprising:
   one or more processors; and
   one or more memories comprising computer program codes, the one or more memories and the computer program codes being configured to, with the one or more processors, cause the apparatus at least to:
      receive, from a network node, configuration information about capability of the terminal device to schedule uplink data transmission to the network node; and
      determine whether to schedule, by the terminal device, the uplink data transmission, based at least in part on the configuration information; and
   the terminal device capable of scheduling the uplink data transmission, and the determination of whether to schedule the uplink data transmission by the terminal device based at least in part on the configuration information comprises:
      determining whether radio resource granted by the network node is enough to empty uplink data buffered at the terminal device, wherein the granted radio resource is available for the terminal device to transmit uplink data scheduled by the network node, and determining to schedule the uplink data transmission by the terminal device, in response to the determination that the granted radio resource is not enough to empty the uplink data buffered at the terminal device.

9. The apparatus of claim 8, wherein the one or more radio resource units comprise at least one radio resource unit sharable by the terminal device and one or more other terminal devices.

10. The apparatus of claim 8, wherein the configuration information comprises an indicator of whether to enable or disable the capability of the terminal device to schedule the uplink data transmission.

11. The apparatus of claim 8, wherein the determination to schedule the uplink data transmission by the terminal device is made further in response to at least one of that:

the uplink data transmission is for a service with a predefined quality class; and the uplink data transmission enables the uplink data buffered at the terminal device to be emptied.

12. The apparatus of claim 8, further comprising:

generating a scheduling message based at least in part on the configuration information received from the network node; and:

transmitting the scheduling message to the network node to indicate scheduling of the uplink data transmission by the terminal device.

13. The apparatus of claim 12, wherein the scheduling message is transmitted by the terminal device upon transmission of uplink data scheduled by the network node.

14. The apparatus of claim 8, further comprising:

initiating the uplink data transmission scheduled by the terminal device, in response to completion of transmitting the uplink data scheduled by the network node.

* * * * *